United States Patent

Wachtell et al.

[15] 3,650,635
[45] Mar. 21, 1972

[54] TURBINE VANES

[72] Inventors: Richard Lloyd Wachtell, Tuxedo Park; Edward C. Palmenberg, Nanuet, both of N.Y.

[73] Assignee: Chromalloy American Corporation

[22] Filed: Mar. 9, 1970

[21] Appl. No.: 17,752

[52] U.S. Cl. ........................ 415/115, 29/156.8, 29/401, 416/241
[51] Int. Cl. ......................................................... F01d 5/14
[58] Field of Search ........................... 415/115, 219; 416/241

[56] References Cited

UNITED STATES PATENTS

| | | | |
|---|---|---|---|
| 3,260,505 | 7/1966 | Ver Snyder | 416/241 |
| 2,629,923 | 3/1953 | Johnson, Jr. | 416/241 |
| 3,312,449 | 4/1967 | Chandley | 416/241 |
| 3,494,709 | 2/1970 | Piearcey | 416/241 |

Primary Examiner—C. J. Husar
Attorney—Sandoe, Hopgood & Calimafde

[57] ABSTRACT

An improved airfoil is provided for turbine engines having locating buttresses at opposite ends thereof, said airfoil having a leading edge and a trailing edge. The body of the airfoil section has a polycrystalline structure of equiaxed grains, at least one of the airfoil edges being comprised of a welded insert having grains running longitudinally of said edge.

14 Claims, 7 Drawing Figures

FIRST STAGE TURBINE ENGINE GUIDE
VANE SHOWING TRAILING EDGE
PORTION OF THE AIRFOIL REMOVED
FROM THE ORIGINAL BODY SECTION

Patented March 21, 1972
3,650,635
2 Sheets-Sheet 1
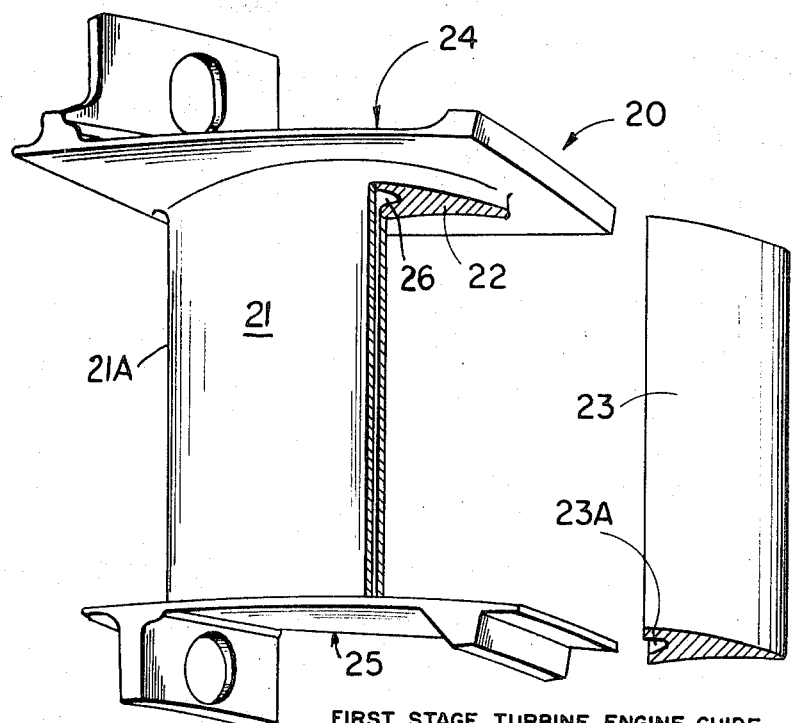
FIRST STAGE TURBINE ENGINE GUIDE VANE SHOWING TRAILING EDGE PORTION OF THE AIRFOIL REMOVED FROM THE ORIGINAL BODY SECTION
FIG. 1
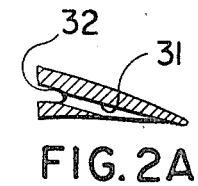
FIG. 2A
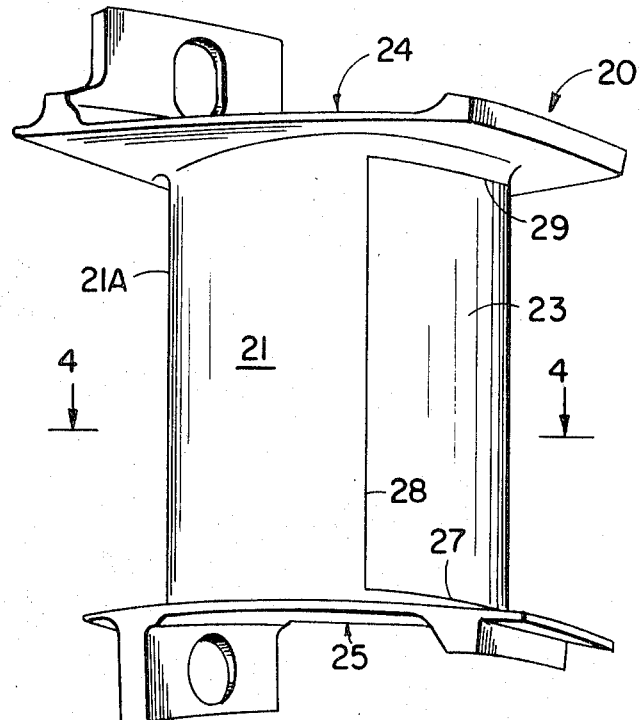
FIG. 3
FIG. 2
INVENTORS
RICHARD L. WACHTELL
EDWARD C. PALMENBERG
by
Sandoe, Hopgood & Calimafde
ATTORNEYS Patented March 21, 1972

CROSS SECTIONAL VIEW OF
TYPICAL ARRANGEMENT SUITABLE
FOR PRODUCING A CASTING
HAVING GRAIN ORIENTATION
ALONG THE LONGITUDINAL AXIS.

*INVENTORS*
RICHARD L. WACHTELL
EDWARD C. PALMENBERG by

*Sandoe, Hopgood & Calimafde*

ATTORNEYS

TURBINE VANES

This invention relates to an improved airfoil construction employed as a thermal element in jet engines, such as turbine guide vanes, and to a method for producing the same in which the airfoil is provided with the capability of effectively resisting thermal shock at elevated temperature. This invention also relates to an improved method for turbine vane repair.

Nozzle vanes in gas turbines and the like are subjected in service to severe stresses at high operating temperatures and to extreme thermal cycling which tends to cause failure by fatigue. Generally speaking, the vanes are cast from heat resisting superalloys of the nickel-base and cobalt-base types. The airfoil section usually has a polycrystalline structure of the equiaxed type which confers good resistance to high temperature creep.

On the other hand, columnar grains provide good ductility and excellent resistance to thermal shock. It is known to produce turbine blades and vanes having columnar grains with substantially unidirectional crystals aligned substantially parallel to the axis of the blade or vane. The grain boundaries of the cast turbine part or thermal element, are oriented so as to be substantially parallel to the principal stress axis of the part while avoiding as much as possible grain boundaries normal to the stress axis.

Such structures are obtained by controlled directional freezing of a casting. The mold into which the molten alloy is poured is prepared with a base that rests on or is adjacent to a water-cooled copper base, the mold being electrically heated above the base to provide a substantially uniform thermal gradient from the cool part to the top of the mold. Thus, by assuring unidirectional heat flow, the liquid-solid interface at the growing grains is caused to move in one direction, i.e., from the bottom of the mold to the top. Particular care must be taken to avoid nucleation in the melt ahead of the advancing interface, otherwise equiaxed grain structures tend to form leading to grain boundaries which may be transverse or normal to the leading or trailing edges of the airfoil. The trailing edge is particularly vulnerable to thermal fatigue cracking, especially where the grain boundaries are transverse to the edge.

Generally speaking, most airfoil sections, such as cast vanes, have a polycrystalline equiaxed grain structure, the unidirectionally cooled vane being expensive and difficult to make. This is particularly true of vanes having locating buttresses of complex shape which tend to interfere with the proper growth of oriented columnar grains throughout the component.

Airfoil thermal elements or vanes of the conventionally cast type are frequently removed from turbine engines for overhaul before they fail completely. Such vanes generally show defects, such as cracks, nicks or erosion spots at the airfoil edges, particularly at the trailing edge. We have found that such vanes can be reworked by cutting out a longitudinal section containing the defect and welding in its place a longitudinal insert of the same material containing columnar grains, so that the reworked vane is even better than the vane as originally cast.

We have found that the foregoing method can also be used in producing new guide vanes as will be apparent from the following disclosure.

It is thus the object of the invention to provide a turbine guide vane of improved construction.

Another object is to provide a cast turbine guide vane in which substantially the body of the airfoil section has an equiaxed grain structure, but in which one of the airfoil edges, e.g., the trailing edge, is formed of a longitudinally shaped welded insert characterized by columnar grains which are disposed longitudinally along the airfoil edge.

A further object is to provide a method of producing turbine guide vanes of improved construction.

A still further object is to provide a method for reworking used turbine guide vanes, wherein the reworked vane is characterized by improved resistance to thermal cracking at elevated operating temperatures.

These and other objects will more clearly appear when taken in conjunction with the following disclosure and the accompanying drawing, wherein:

FIG. 1 is an exploded view of the main body of a turbine guide vane together with a trailing edge insert prior to the welding-in-place of the trailing edge;

FIG. 2 is illustrative of a trailing edge insert showing an assembly of cooling holes in the directionally cast insert running transverse to the edge;

FIG. 2A is a cross section of the trailing edge insert of FIG. 2 viewed along line 2A—2A;

FIG. 3 is the same turbine guide assembly illustrated in FIG. 1 with the trailing edge insert welded in place;

Figure 5:
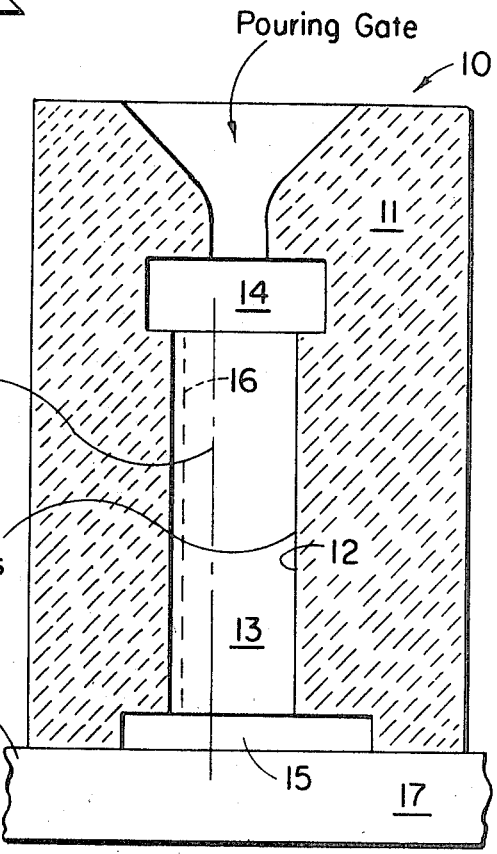
Figure 6:
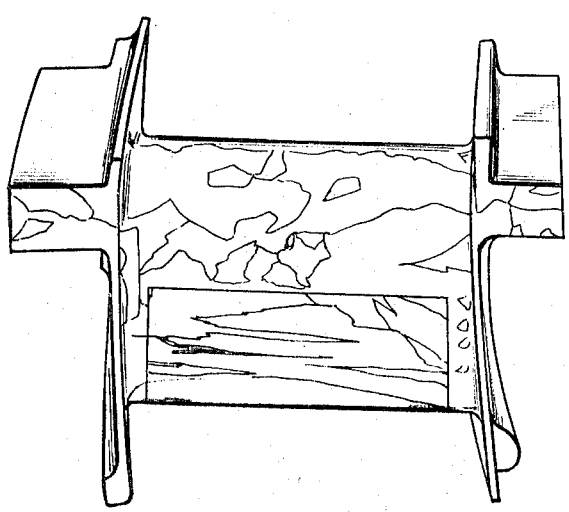

FIG. 5 is illustrative of a mold employed in the production of directionally cast trailing edge inserts employed in the invention; and FIG. 6 is a drawing of a macrophotograph of an etched turbine guide vane reworked in accordance with the invention, the main body of the airfoil section showing equiaxed grains, the trailing edge insert showing long columnar grains running longitudinally of the trailing edge.

Stating it broadly, a turbine airfoil section, e.g., a guide vane, of improved construction is provided having buttresses at opposite ends thereof, the airfoil section having a leading and a trailing edge. The main body of the airfoil section has a polycrystalline structure with equiaxed grains, at least one of the airfoil edges, for example, the trailing edge, being formed of a welded longitudinally shaped insert having columnar grains running longitudinally of said edges.

The invention is particularly applicable to the repairing of turbine guide vanes comprising an airfoil section and locating buttresses at opposite ends thereof, with at least one of the airfoil edges having defects therein which need repair. However, the invention is applicable to vanes without locating buttresses. As stated hereinbefore, airfoil sections having a metallographic structure characterized by equiaxed grains tend to fail by thermal shock at, for example, the trailing edge, due to thermal cracking occurring in grain boundaries disposed transverse to the trailing edge. These vanes are reworked or overhauled by cutting out a longitudinal section containing the defect and welding in its place in the cut-out portion a longitudinal insert having columnar grains which run along the trailing edge. The longitudinal insert is substantially rectangular and uniform in shape and is easily produced by precision casting in a mold adapted to provide directional cooling of the melt poured into the type of mold 10 shown in FIG. 5 comprising the usual precision casting mold made of a ceramic 11, such as quartz, having a mold cavity 12 therein conforming to the shape of a trailing edge insert 13 with end sprues 14 and 15 which are later removed from the casting. The dotted line 16 is the continuation of the hollow of the airfoil section (note FIG. 4) with which the trailing edge insert is match-fitted when it is welded in place. The bottom of the mold is disposed adjacent cold body 17 from which end directional cooling begins. The columnar grains in the insert are oriented so that they are substantially parallel to the edge with almost complete elimination of grain boundaries normal to the edge. Thus, the repaired vane is generally improved in performance at the trailing edge as compared to the original vane.

The heat resistant nickel-base or cobalt-base superalloys which may be used in producing turbine components usually contain at least about 35 percent by weight of nickel and/or cobalt and, more preferably, at least about 50 percent by weight thereof, and, in addition, about 2 percent to 30 percent by weight of chromium, 0 to about 9 percent titanium, 0 to about 6 percent aluminum, the sum of the titanium and aluminum content when present being at least about 2 or 3 percent, up to about 15 percent by weight of molybdenum and/or tungsten, up to about 10 percent tantalum, up to about 3 percent columbium, up to about 5 percent iron, up to about 1.5 percent vanadium, up to about 1 percent silicon, up to about 1 percent manganese, up to about 0.5 percent carbon, up to about 0.1 percent boron, and up to about 2.5 percent zirconium.

An example of a nickel-base alloy is one containing about 5% to 25% Cr, about 4% to 30% Co, about 2% to 14% Mo and/or W, 0 to about 9% Ti, 0 to about 6% Al, the sum of Ti and Al when present being at least about 3.5%, about 0.1% to 0.5% C, about 0.005% to 0.1% boron, about 0.05% to 0.2% zirconium, and the balance essentially nickel.

An example of a cobalt base alloy is one referred to in the trade as Alloy WI 52 as follows: 0.4% to 0.5% C, 0.5% Mn max., 0.5% Si max., 0.04% P max., 0.04% S max., about 20 to 22% Cr, about 10 to 12% W, about 1.5 to 2.5% Cb and/or Ta, about 1 to 2.5% Fe, and the balance essentially cobalt.

Another cobalt-base alloy designated as Alloy X-40 has the following composition: about 0.45 to 0.55% C, 1% Mn max., 1% Si max., 0.04% P max., 0.04% S max., about 24.5% to 26.5% Cr, about 9.5% to 11.5% Ni, about 7 to 8% W, 2% Fe max., and the balance essentially cobalt.

An important advantage of the invention is that the trailing edge insert, because of its simple geometry, can be made relatively economically. It is possible to incorporate in such a design airfoil cooling passages currently employed in vane design with much less difficulty than can be done where the vane is cast in one piece. Thus, the directionally solidified insert confers added fatigue resistance to the trailing edge where the weak points in conventional design exist without sacrificing stiffness properties in the balance of the airfoil section. The additional advantage of the invention resides in a novel repair technique for vanes which otherwise are virtually unrepairable once thermal fatigue cracking occurs.

Another advantage of using a trailing edge insert produced by directional solidification is that the insert can be cast with ceramic cores which can later be leached out to provide economically produced cooling holes. At present, because of the angles at which these holes are introduced into the leading edge portion of the airfoil, it is necessary to machine such holes into the component by electrical discharge machining techniques.

Figure 4:
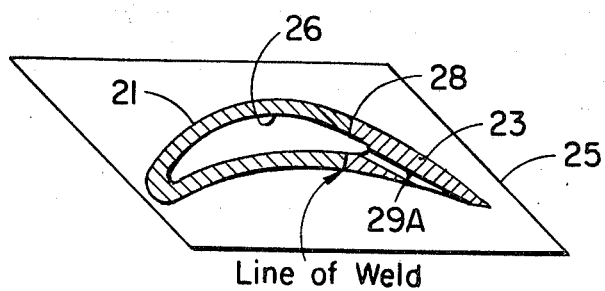
FIG. 4 is a cross-section of the turbine guide vane of FIG. 3 taken through line 4—4 showing the welded trailing edge insert relative to the original airfoil section.

As illustrative of one embodiment of a hollow turbine guide vane to which the invention is applicable, reference is made to FIG. 1 which is an exploded view in three dimensions of a guide vane 20 comprising an airfoil section 21 having a leading edge 21A and having a longitudinal cutout 22 at the trailing edge prepared to receive a longitudinally shaped trailing edge insert 23. Opposite ends of the airfoil are provided with outer locating buttress 24 and inner locating buttress 25. The insert 23 has a longitudinally extending kerf 23A at its wide edge which is a continuation of the hollow 26 of the airfoil (note also FIG. 4) with which it is match-fitted and welded to produce the part shown in FIG. 3, the insert being welded, e.g., electron beam welded, along weld lines 27, 28 and 29 (FIG. 4). The vane shown in FIGS. 1, 3 and 4 is a first stage turbine engine guide vane.

FIG. 4, which is a cross-section taken along line 4—4 of FIG. 3, shows a cooling hole 29A serving as an exit orifice in the trailing edge insert 23 for the cooling fluid circulated through the hollow of the vane.

A cast trailing edge insert 30 with cooling holes 31 is shown in FIG. 2, the dotted line 32 indicating the end of the kerf shown in FIG. 2A which is the terminal portion of the hollow in the vane. FIG. 2A is a cross section of the insert of FIG. 2.

In producing the cast insert using the mold of FIG. 5, a wax or plastic pattern is provided having the shape 13 shown in FIG. 5, the pattern being provided with end sprues 14 and 15 to insure a good quality insert free from shrinkage cavities, and the like. The pattern is surrounded by a refractory slurry which is allowed to set and the mold fired to remove the pattern material and leave a mold cavity conforming to the shape of the insert. An alloy, such as WI-52, is melted and cast at about a temperature of 3,100° F. into the mold supported on cold body 17 shown in FIG. 5. After completion of solidification, the insert is removed from the mold, trimmed, cleaned and then machined to precise dimensions. The insert is then welded to a guide vane prepared as shown in FIG. 1. The welding may be accomplished in either one of two ways. One method referred to as tungsten inert gas welding uses an electric torch comprising a tungsten inert gas electrode in which an arc is formed at the interface to be welded to which is fed a wire of a cobalt-base superalloy or other alloy compatible with the alloy of the vane. This technique produces a thin sound weldment. Electron beam welding is another method. The parts which are fitted precisely together are placed under a highly collimated beam of highly charged electrons focused upon the interface. The work piece is moved under the beam until the whole length of the interface has been traversed and welded.

As illustrative of a guide vane produce in accordance with the invention, reference is made to FIG. 6 which is a macrograph showing the vane with its welded insert, the vane being etched to show long columnar grains in the insert running parallel to the trailing edge, with equiaxed grains in the original body of the airfoil.

Actual thermal shock tests conducted on the guide vane of the type depicted in FIG. 6 produced according to the invention showed a marked improvement over a similar vane produced by a conventional method, that is, a conventionally cast polycrystalline vane. The test involves heating the vane to 1,850° F. and cooling rapidly to about 1,050° F. in cyclic fashion and counting the number of cycles to failure.

The results of the test showed that the vane of the invention could withstand up to 1,100 cycles of heating and cooling before failure as compared to a range of 100 to 300 cycles for a conventionally produced polycrystalline vane. As will be apparent, this is a marked improvement.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An improved airfoil thermal element for turbine engines, substantially the body of which has a polycrystalline structure with equiaxed grains, an airfoil edge of which is formed as a welded insert having columnar grains which are substantially parallel to said airfoil edge.

2. The improved airfoil of claim 1, wherein the airfoil is hollow.

3. The improved airfoil of claim 1, wherein the airfoil edge insert is a trailing edge.

4. The improved airfoil of claim 3, wherein the airfoil is hollow, and wherein said trailing edge has cooling holes disposed transversely of said trailing edge which communicate with the hollow of said vane.

5. An improved turbine guide vane of a heat resistant alloy having an airfoil section substantially the body of which has a polycrystalline structure with equiaxed grains, an airfoil edge of the vane being formed as a welded insert having columnar grains which are substantially parallel to said airfoil edge.

6. The improved turbine guide vane of claim 5, wherein the vane is hollow.

7. The improved turbine guide vane of claim 5, wherein the airfoil edge insert is a trailing edge.

8. The improved turbine guide vane of claim 7, wherein the vane is hollow and wherein said trailing edge has cooling holes disposed transversely of said trailing edge which communicate with the hollow of said vane.

9. The improved turbine guide vane of claim 5, wherein the heat resistant alloy of the vane is selected from the group consisting of nickel-base and cobalt-base superalloys.

10. A turbine guide vane of a heat resistant alloy comprising an airfoil section with locating buttresses at opposite ends thereof, said airfoil section having a leading edge and a trailing edge, substantially the body of said airfoil section having a polycrystalline structure with equiaxed grains, at least one of the airfoil edges being a welding insert having columnar grains running substantially parallel to said airfoil edge.

11. The improved turbine guide vane of claim 10, wherein the vane is hollow.

12. The improved turbine guide vane of claim 10, wherein the airfoil edge is the trailing edge.

13. The improved turbine guide vane of claim 12, wherein said trailing edge has cooling holes disposed transversely of said trailing edge which communicate with the hollow of said vane.

14. The improved turbine guide vane of claim 10, wherein the heat resistant alloy of the vane is selected from the group consisting of nickel-base and cobalt-base superalloys.

* * * * *